United States Patent [19]
Cooper et al.

[11] Patent Number: 5,625,804
[45] Date of Patent: Apr. 29, 1997

[54] DATA CONVERSION IN A MULTIPROCESSING SYSTEM USABLE WHILE MAINTAINING SYSTEM OPERATIONS

[75] Inventors: Ronald C. Cooper, New Fairfield, Conn.; Bryan A. Foley, Hopewell Junction, N.Y.; George E. Graffius, III, Beacon, N.Y.; Leslie F. Sutton, LaGrangeville, N.Y.

[73] Assignee: International Business Machines Corporation, Armonk, N.Y.

[21] Appl. No.: 422,974

[22] Filed: Apr. 17, 1995

[51] Int. Cl.⁶ .................................................. G06F 13/00
[52] U.S. Cl. .................... 395/500; 395/680; 395/779; 364/260; 364/260.1; 364/242.4; 364/DIG. 1
[58] Field of Search ........................ 395/500, 161, 395/144, 145, 149, 650, 600; 364/260, 260.1, DIG. 1, 242.4

[56] References Cited

U.S. PATENT DOCUMENTS

| | | | |
|---|---|---|---|
| 4,485,439 | 11/1984 | Rothstein | 364/200 |
| 4,493,023 | 1/1985 | Gavrin et al. | 364/200 |
| 4,823,261 | 4/1989 | Bank et al. | 364/200 |
| 4,924,383 | 5/1990 | Suzuki | 364/200 |
| 4,951,192 | 8/1990 | Chase, Jr. et al. | 364/200 |
| 4,956,809 | 9/1990 | George et al. | 364/900 |
| 5,155,837 | 10/1992 | Liu et al. | 395/500 |
| 5,179,702 | 1/1993 | Spix et al. | 395/650 |
| 5,212,789 | 5/1993 | Rago | 395/600 |
| 5,251,291 | 10/1993 | Malcolm | 395/146 |
| 5,251,318 | 10/1993 | Nitta et al. | 395/725 |
| 5,307,504 | 4/1994 | Robinson et al. | 395/800 |
| 5,339,405 | 8/1994 | Elko et al. | 395/575 |
| 5,339,430 | 8/1994 | Lundin et al. | 395/700 |
| 5,359,730 | 10/1994 | Marron | 395/650 |
| 5,369,778 | 11/1994 | San Soucie et al. | 395/800 |
| 5,392,390 | 2/1995 | Crozier | 395/161 |
| 5,537,592 | 7/1996 | King et al. | 395/600 |

*Primary Examiner*—Kevin J. Teska
*Assistant Examiner*—Thai Phan
*Attorney, Agent, or Firm*—Lawrence D. Cutter, Esq.; Heslin & Rothenberg, P.C.

[57] ABSTRACT

In a multiprocessing system, data which is stored on an external storage media and shared by a plurality of processors is converted from an old format to a new format without bringing the multiprocessing system down. One processor at a time is provided the capability to view the data in the new format, while the other processors view the data in the old format. After all of the processors are capable of viewing the data in the new format, the data is converted from the old format to the new format and the data in the new format is stored on the external storage media. If for some reason the new format turns out to be unacceptable, procedures are also in place for falling back to the old format without disrupting system availability.

20 Claims, 6 Drawing Sheets

DATA CONVERSION IN A MULTIPROCESSING SYSTEM USABLE WHILE MAINTAINING SYSTEM OPERATIONS

TECHNICAL FIELD

This invention relates in general to data processing within a multiprocessing system and, in particular, to converting data from an old format to a new format without bringing the multiprocessing system down.

BACKGROUND ART

Certain industries, such as the airline and banking industries, require their data processing systems to be up and running twenty-four hours a day. They cannot afford to have their systems unavailable for any amount of time, no matter how small that amount of time may be. Thus, efforts are continually being made to increase system availability.

In one example, system availability is enhanced by enabling operating system software to be modified while the system is running. One technique for dynamically modifying system software is described in U.S. Pat. No. 5,359,730 entitled "Method of Operating a Data Processing System Having A Dynamic Software Update Facility," issued on Oct. 25, 1994 and assigned to International Business Machines Corporation.

In particular, the patent discloses a technique for non-disruptively replacing old operating system programs with new updated versions while providing continuous availability and operation of the data processing system. Specifically, new versions of the software are loaded into the system along with change instructions providing information controlling the update. Initially, every invocation of the old version is intercepted by the system, and the dynamic software update facility determines the state of the process which invoked the program. If the process is "unsafe", the facility passes control to the old version of the program. However, if the process is "safe", then control is passed to the new version.

The above-described technique however, does not address the problem of migrating shared data from an old format to a new format without disrupting system availability. For instance, assume that a data processing system includes two processors, each of which shares a datum stored on an external storage media. Typically, in order to reformat that datum, the data processing system is brought down, the datum is reformatted, new programming code is loaded onto each of the processors to use the reformatted datum, and the processors are brought back up. This necessarily disrupts system availability causing serious problems for high or continuous availability systems.

Based on the foregoing, a need exists for a data conversion technique, which is non-disruptive to the availability of the data processing system. Further, a need exists for a technique that allows one processor to use the data in one format, while another processor uses the data in another format. A further need exists for a data conversion technique that is dynamic and transparent to the user in that the user does not have to be aware of the structure of a particular datum. A yet further need exists for a technique that does not require the storing, maintaining and synchronizing of the data in the new and old formats. A further need exists for a technique that permits the reformatted datum to be backed out to its previous format without disruption to the data processing system.

SUMMARY OF THE INVENTION

The shortcomings of the prior art are overcome and additional advantages are provided through the provision of a data conversion method in a multiprocessing system. The multiprocessing system includes a first processor, a second processor, and an external storage media coupled to the first processor and the second processor. The external storage media includes a datum having a first format. The datum is sharable by the first processor and the second processor. The first processor retrieves the datum from the external storage media in the first format and uses the retrieved datum in a second format. However, the datum is still usable by the second processor in the first format. Subsequently, the second processor retrieves the datum from the external storage media in the first format and uses the retrieved datum in the second format. Thus, both the first and second processors are capable of using the datum in the second format. When the datum is usable by the first and second processors in the second format, the datum on the external storage media is converted from the first format to the second format. This conversion allows the first processor and said second processor to remain activated.

In another aspect of the present invention, a multiprocessing system is provided. The multiprocessing system includes an external storage media including a datum having a first format, a first processor and a second processor coupled to the external storage media. The first processor is programmable to retrieve the datum from the external storage media in the first format and to use the datum in the second format when the datum is retrieved. The datum is also usable by the second processor in the first format. The second processor is programmable to retrieve the datum from the external storage media in the first format and to use the datum in the second format when it is retrieved. Thus, the datum is usable by the first and second processors in the second format. The multiprocessing system also includes means for converting the datum on the external storage media from the first format to the second format when the datum is usable by the first and second processors in the second format. The means for converting includes means for allowing the first processor and the second processor to remain activated during the conversion.

The data conversion technique of the present invention advantageously enables data to be converted from one format to another while maintaining system operations. Additionally, the technique allows one processor to use the data in one format, while another processor uses the data in another format; thereby, permitting one processor to test the new data format before all of the processors begin to use it. Further the data conversion technique of the present invention is dynamic and transparent to the user in that the user does not have to be aware of the structure of a particular datum. A further advantage is that the technique does not require the storing, maintaining and synchronizing of the datum, in the new and old formats. Additionally, the technique permits the reformatted datum to be backed-out to its previous format without disruption to the data processing system, in the event such a back-out is desired.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention will be apparent from the following detailed description taken in conjunction with the accompanying drawings in which:

BEST MODE FOR CARRYING OUT THE INVENTION

In accordance with the principles of the present invention, a technique is provided for converting data stored on an external storage media and shared by a plurality of processors of a multiprocessing system from one format to another format without collapsing the multiprocessing system. The system remains up and running and each processor uses the data in either a first or second format depending on whether new code was installed on the processor. When new code is loaded on a processor, that processor translates the data from the first format to the second format and uses the data in the second format. Thereafter, it stores the data, whether updated or not, on the external storage media in the first format. After the new code is loaded on all of the processors sharing the data, the data is converted from the first format to the second format and stored on the external storage media in the second format.

The above procedure of having one processor at a time use the new code and data format enables a user to test the code and/or data format prior to migrating the code onto one or more of the other processors of the system. If the test reveals a flaw in the code or the data format, the user can fall back to the old code and old data format without disrupting system availability.

Figure 1:
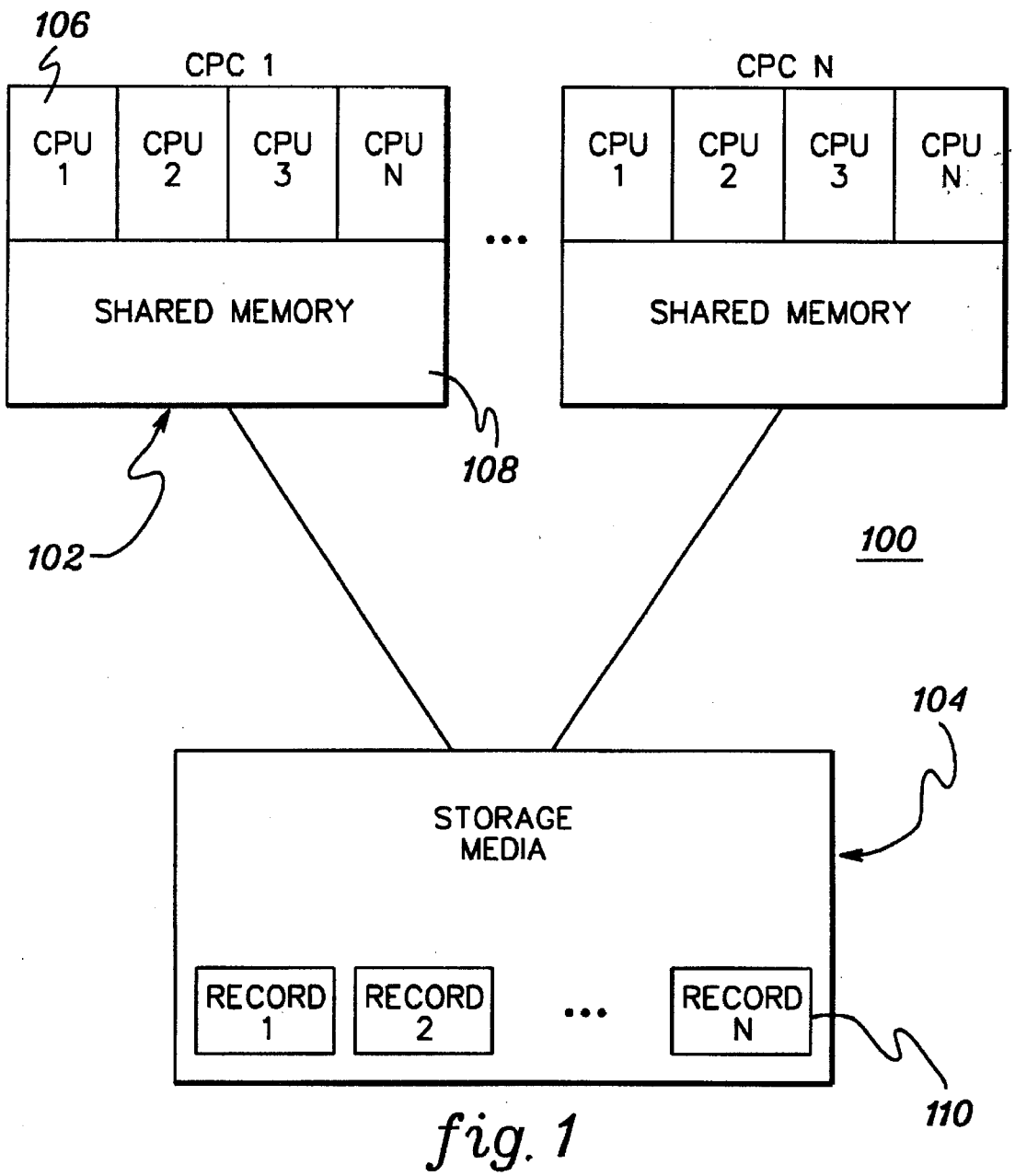
FIG. 1 depicts one example of a multiprocessing system incorporating the data conversion technique of the present invention.

One embodiment of a multiprocessing system incorporating the data conversion technique of the present invention is depicted in FIG. 1 and described in detail below. In one example, a multiprocessing system 100 includes one or more central processing complexes (CPC) 102 coupled to an external storage media 104. Central processing complexes 102 and external storage media 104 are described in detail below.

In one embodiment, each central processing complex 102 is an Enterprise Systems Architecture (ESA)/3090 system incorporating the ESA/390 architecture offered by International Business Machines Corporation and described in detail in Enterprise Systems Architecture/390 Principles of Operation, International Business Machines Corporation Publication No. SA22-7201-02, (Dec. 1994), which is incorporated herein by reference in its entirety. Each central processing complex includes, for instance, one or more central processing units (CPU) 106 and a memory 108 shared by the central processing units. The central processing units execute an operating system, such as, for instance, a commercially available Transaction Processing Facility (TPF) operating system offered by International Business Machines Corporation. As is known, TPF controls the execution of programs running in the CPC and the processing of data. Specifically, in accordance with the principles of the present invention, TPF controls the data conversion procedure of the present invention. Each central processing complex 102 also includes a channel subsystem (not shown) for coupling the CPC to external storage media 104.

External storage media 104 may be, for instance, a direct access storage device (DASD), a magnetic tape, a diskette or an optical device (to name just a few examples), for storing data to be shared by the central processing complexes. In one embodiment, external storage media 104 includes one or more data records 110.

Figure 2:
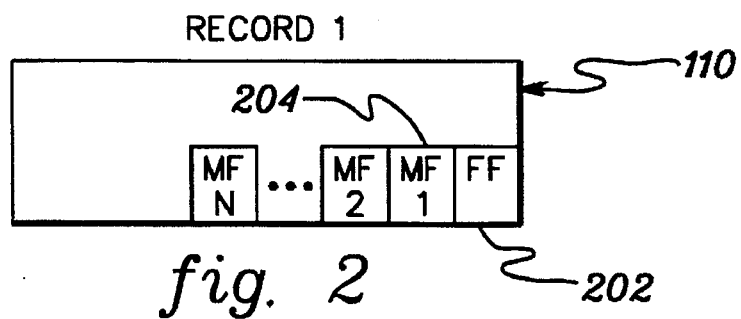
FIG. 2 depicts one embodiment of a data record stored within the multiprocessing system of FIG. 1, in accordance with the principles of the present invention.

In one specific example, one of the data records (e.g., data record 1) is a serialization record, which controls access to other data records and provides status relating to the central processing complexes. In accordance with the principles of the present invention, data record 1 includes, for example, a format flag (FF) 202 (FIG. 2) indicating the status of the record and a migrated flag (MF) 204 for each complex indicating whether or not the complex has received the new code. In addition to the serialization record, external storage media 104 may include one or more additional records. In one example, each of these additional records includes a format flag indicating whether or not the record has been converted to a new format. Unlike the first record, the additional records do not include migrated flag 204.

Described above is one particular example of a data processing system incorporating the data conversion technique of the present invention. As will be apparent to those of ordinary skill in the art, the inventive technique can be incorporated into other types of data processing systems. For example, it is not necessary to have a system that includes central processing complexes. Data processing systems simply having a plurality of processors coupled to the storage media may also incorporate the inventive technique, as well as other data processing systems. The multiprocessing system depicted in FIG. 1 and described above is only one example of a data processing system incorporating the data conversion technique of the present invention. Additionally, in other embodiments, a serialization record is not used and therefore, the status for each record is dependent upon the particular record.

As described above, data stored on external storage media 104 is shared by a plurality of processors or central processing complexes. At times, it is desirable to change the format of a data record (e.g., shift positions within the data record, change the size of the data record, etc.) from an old format to a new format. However, for many systems, such as high availability systems, it is important to provide this ability without bringing the system down. The data conversion technique of the present invention provides such a capability.

In one embodiment, the technique of the present invention is invoked when new programming code requiring a new data format is loaded on a central processing complex. In accordance with the principles of the present invention, the new code is loaded on one central processing complex at a time, such that one complex is running the new code against the data records stored on the storage media, while the other complex(es) is running the old code against the data records. (In another example, it is possible to install the new code on more than one complex at a time.) The central processing complex running the new code translates the data record into a new format, uses the data record in the new format, untranslates the data record from the new format to the old format and then stores the data record in the old format back onto the storage media. The other central processing complex(es) within the multiprocessing system continues to use the data in the old format and is unsuspecting of the translation that occurred. Subsequently, each of the other central processing complexes needing the new code will receive the new code and use the data records in the new format. After all of the complexes receive the new code, the data records are converted from the old format to the new format and stored on the storage media in the new format.

As previously mentioned, the data conversion technique of the present invention is invoked after a new version of programming code requiring the data to be presented in a new format is loaded on a processor. The new code is loaded onto a central processing complex in any conventional manner. For example, the new code may be loaded into shared memory 108 without bringing down the complex. In particular, in one instance, new programming code is installed on the complex by loading a new version of the code and selecting through, for example, an operator command, that new version.

Figure 3:
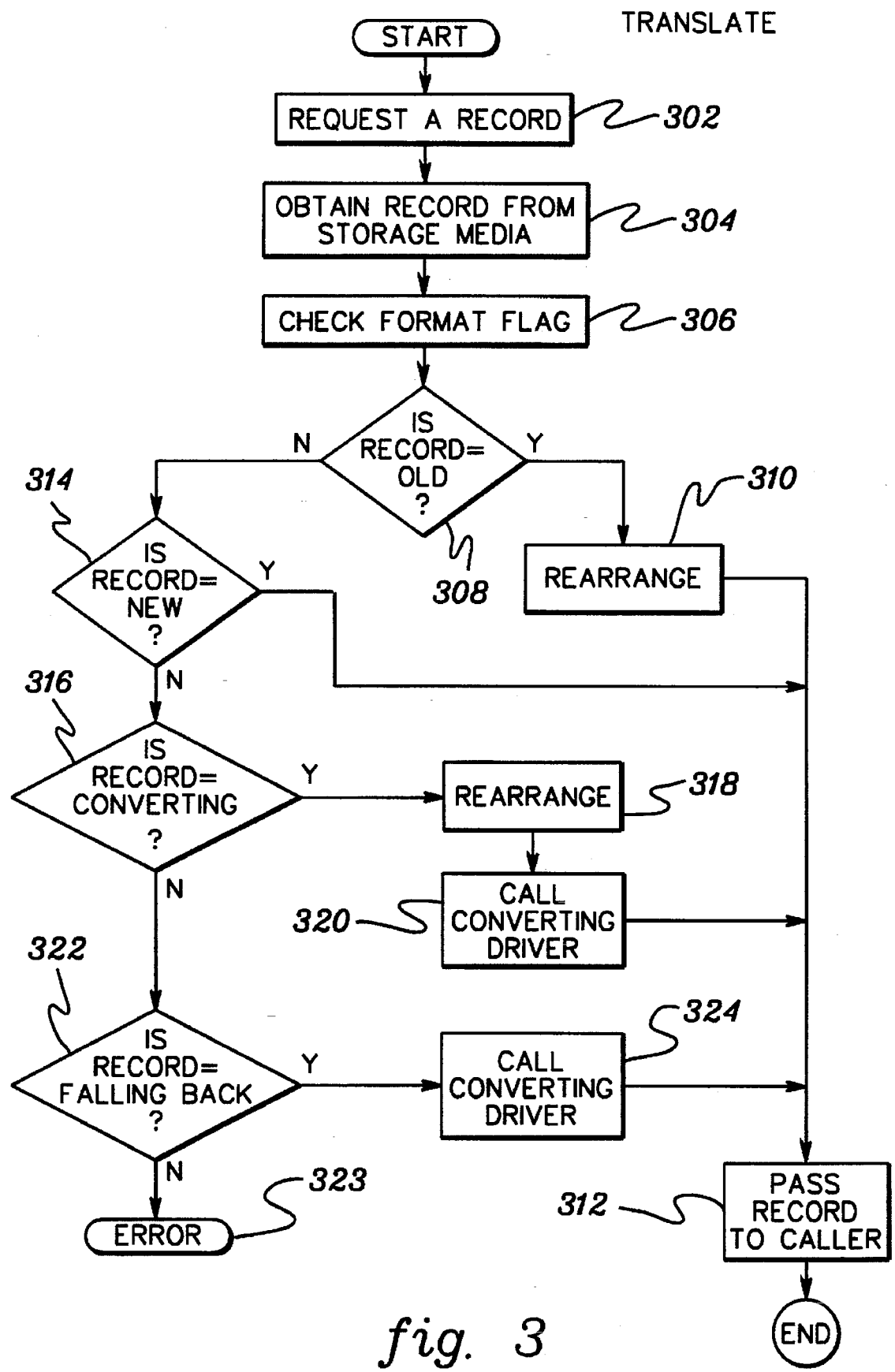
FIG. 3 illustrates one example of the logic associated with translating a data record from one format to another for use by a particular processor of the multiprocessing system of FIG. 1, in accordance with the principles of the present invention.

Once the new code is loaded onto the complex, central processing units within the complex execute the new code, thereby requesting access to data, such as, for example, data record 1 stored on external storage media 104, STEP 302 (FIG. 3) "REQUEST A RECORD." The requested record is retrieved from the storage media and stored in shared memory 108 of the requesting central processing complex for use by the programming code, STEP 304 "OBTAIN RECORD FROM STORAGE MEDIA." In one embodiment, the requesting central processing complex obtains data record 1 with a lock so that other central processing complexes cannot access that record or other data records specified by data record 1 until the lock is released. As is known, the lock is subsequently released when data record 1 is written out to the storage media.

After retrieving the record, format flag 202 is checked to determine the status of the record, STEP 306 "CHECK FORMAT FLAG." In one embodiment, the format flag of record 1 may indicate that the record is old (not converted), new (converted), in the process of being converted from old to new, or in the process of falling back from new to old, as described in detail below.

If the record format indicates that the record is in the old format, INQUIRY 308 "IS RECORD=OLD?", then the record is rearranged into the new format using known techniques, STEP 310 "REARRANGE." As one example, a data record may be rearranged by changing the length of a field within the record from one byte to two bytes. As is known to those skilled in the relevant art, the length is adjusted using the DSECTs of the old and new formats and resetting the appropriate pointers. (The above is only one example of rearranging. The data record can be modified in many other ways, each of which is considered within the scope of the appended claims.) As part of the rearranging procedure, migrated bit 204 for the requesting central processing complex is set to migrated to indicate that it contains the new code. Thereafter, the rearranged data record is passed to the program requiring its use, STEP 312 "PASS RECORD TO CALLER."

Returning to INQUIRY 308 "IS RECORD=OLD?", if however, the record is not indicated as old, then a further inquiry is made as to whether the record is in a new format, INQUIRY 314 "IS RECORD=NEW?" If the record is in the new format, then the record does not have to be translated, and it is simply passed to the caller, STEP 312.

However, if the record is not in the old or new format, then a further determination is made as to whether data record 1 has a status of converting, INQUIRY 316 "IS RECORD=CONVERTING?". That is, are the data records specified by record 1 in the process of being converted? If the record has a converting status, then data record 1 is rearranged, as described above, STEP 318 "REARRANGE," and a converting driver (i.e., programming logic used to perform the conversion or falling back procedures) is called in order to convert the record on the external storage media from the old format to the new format, STEP 320 "CALL CONVERTING DRIVER." One example of a technique for converting a data record, in accordance with the principles of the present invention, is described below with reference to FIGS. 4–4c. After the record is converted, the requested record is passed to the caller, STEP 312.

Returning to INQUIRY 316 "IS RECORD=CONVERTING?", if the record does not have a converting status, then a determination is made as to whether data record 1 has a status of falling back from the new format to the old format, INQUIRY 322 "IS RECORD=FALLING BACK?". If the format flag is not equal to falling back, then an error has occurred, since the format flag does not equal any of the acceptable status conditions, STEP 323 "ERROR." However, when the format flag is equal to falling back, indicating that one or more records are in the process of being unconverted, then the converting driver is invoked, as described in detail below, STEP 324 "CALL CONVERTING DRIVER." Subsequently, the record in the old format is passed to the calling program, STEP 312 "PASS RECORD TO CALLER."

In accordance with the principles of the present invention, subsequent to obtaining record 1, other data records can be accessed. When another data record is accessed and format flag 202 of record 1 has a status of old, the data record is translated to a new format in the manner described above and used in the new format. On the other hand, when another data record is accessed and format flag 202 of record 1 indicates a state of transition: being converted, falling back, then the format flag in the other record is checked to determine if the record has been converted or unconverted. If conversion or unconversion is to take place, it is performed in the manner described below.

In accordance with the principles of the present invention, the data records stored on the external storage media are converted from an old format to a new format using a converting driver. In one embodiment of the present invention, there are two ways in which the converting driver is invoked. One is by a central processing unit within one of the central processing complexes issuing a request to convert a particular data record on the storage media from the old format to the new format, and the second is by a central processing unit detecting that a converting or falling back procedure was interrupted.

Figure 4:
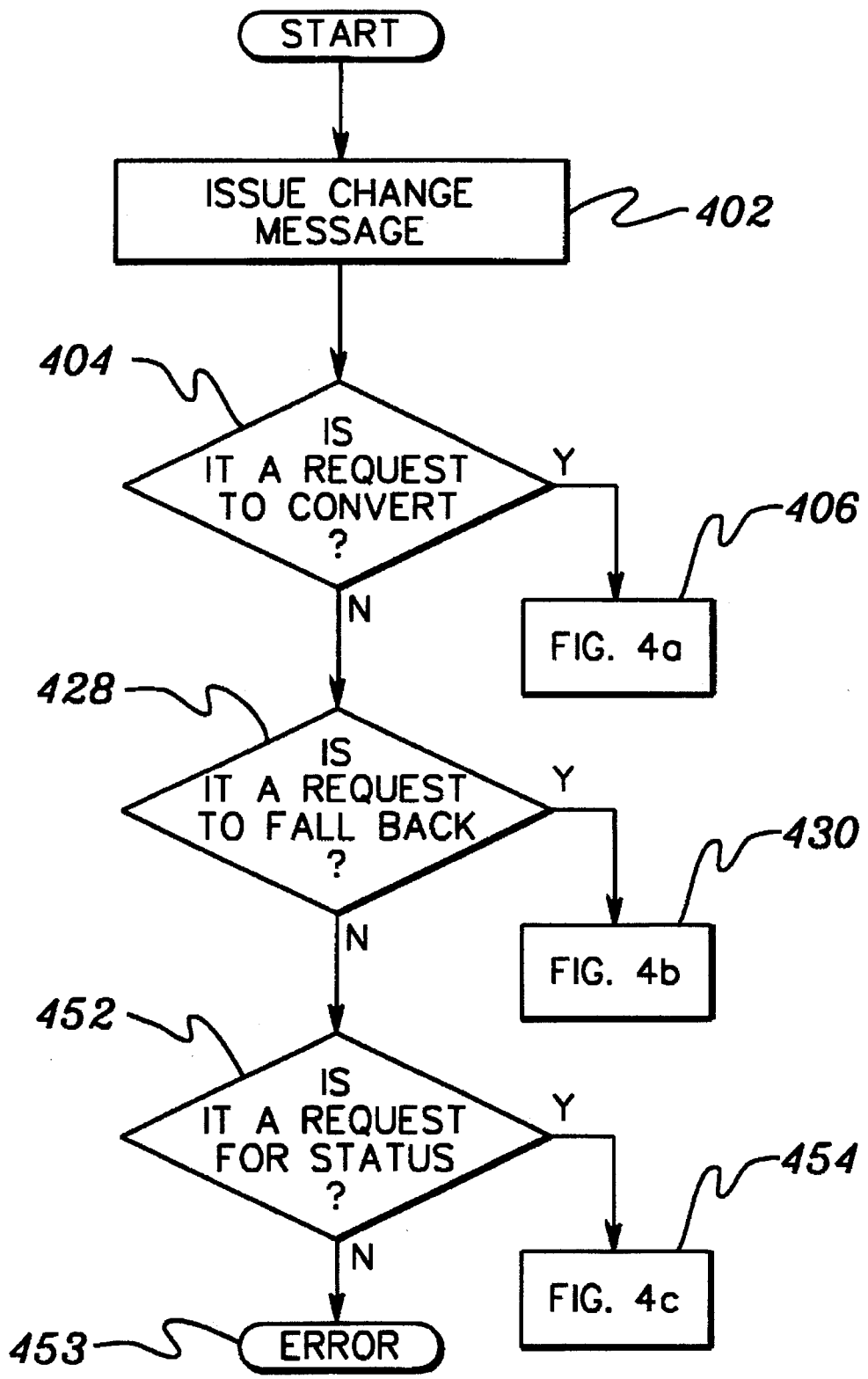
FIG. 4 depicts one example of the logic associated with handling a change request for a particular data record, in accordance with the principles of the present invention.
Figure 4A:
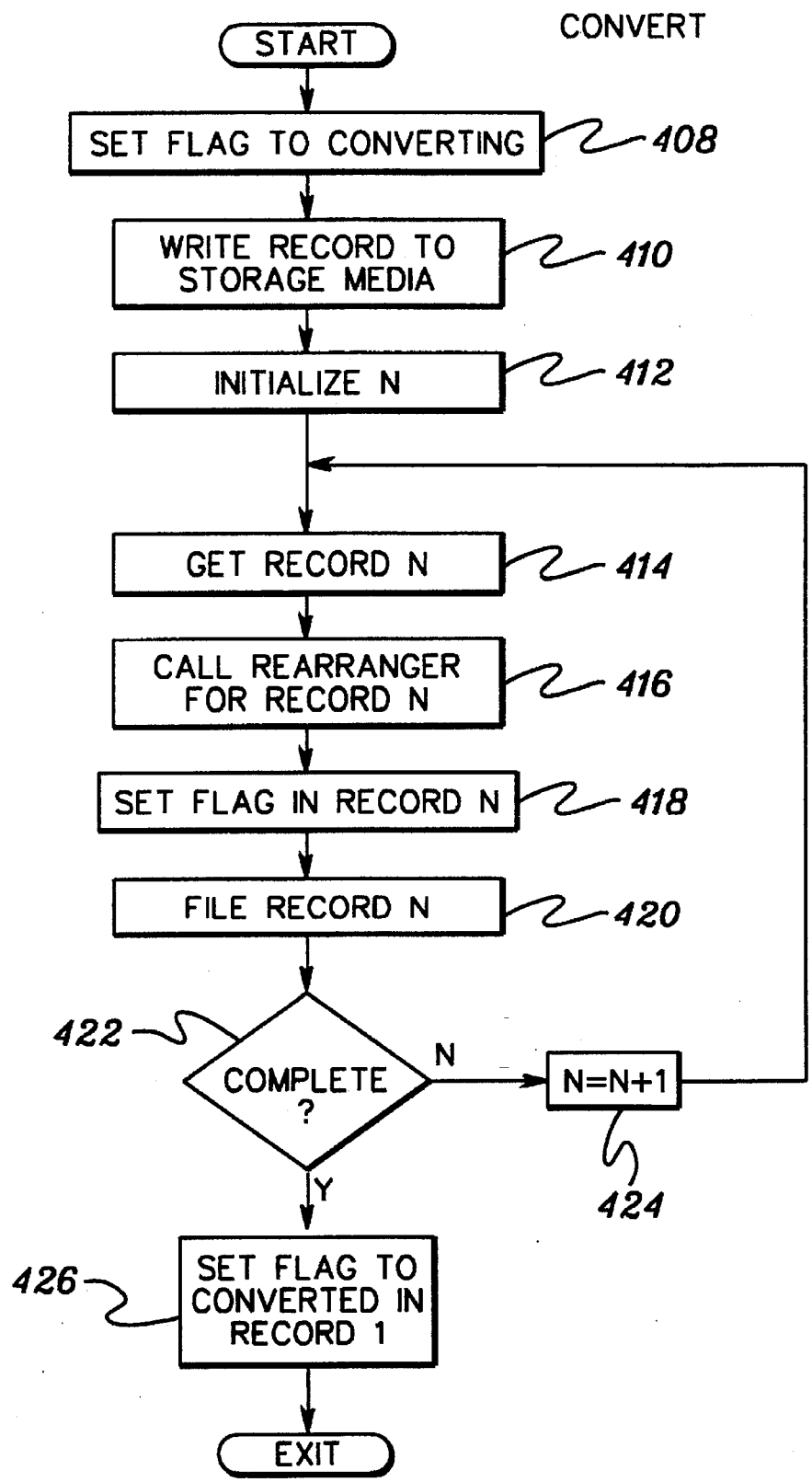
FIG. 4a illustrates one embodiment of the logic associated with converting a data record stored on an external storage media of the multiprocessing system of FIG. 1 from one format to another format, in accordance with the principles of the present invention.
Figure 4B:
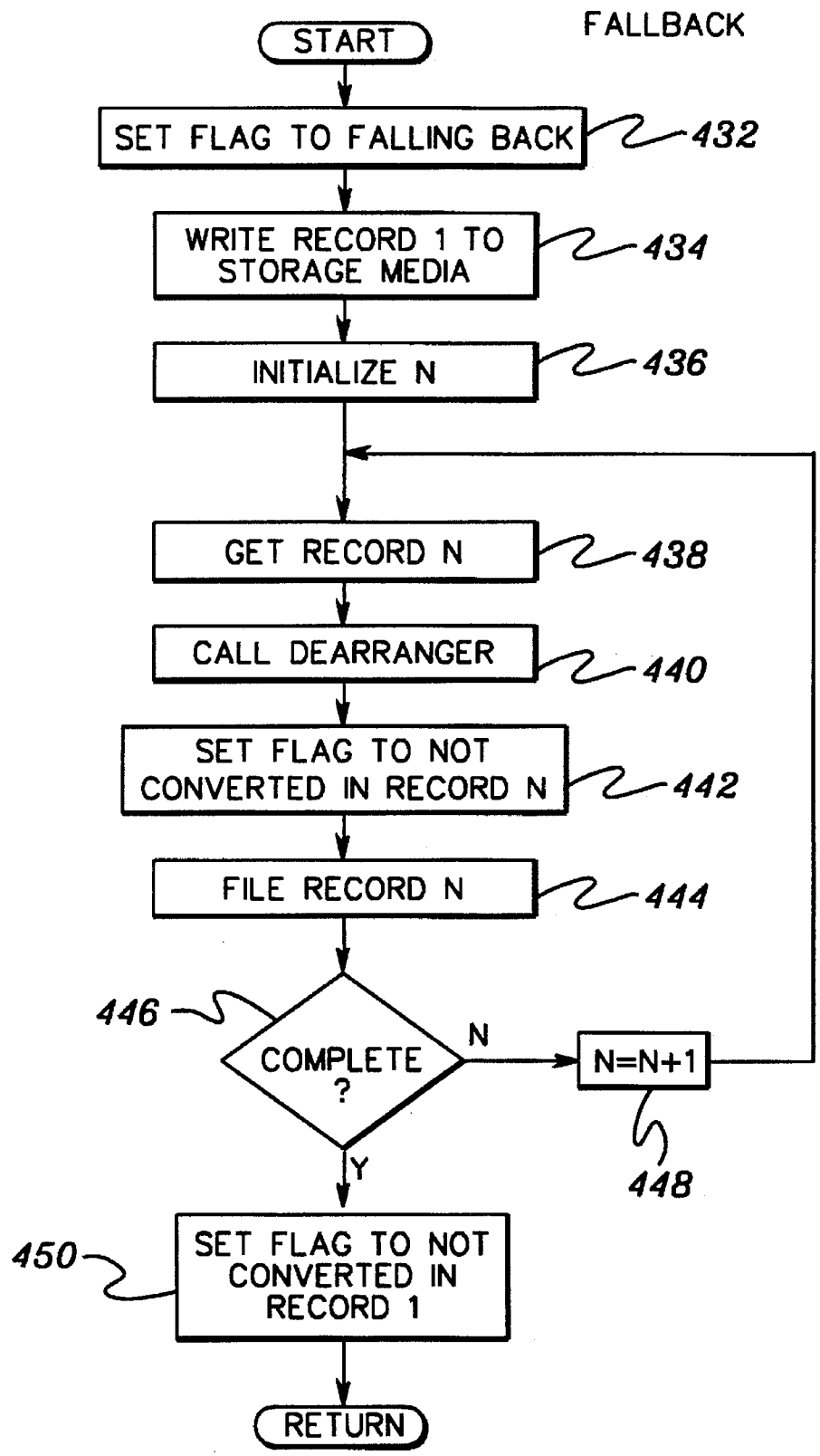
FIG. 4b illustrates one example of the flow associated with returning a converted data record back to its previous format, in accordance with the principles of the present invention.
Figure 4C:
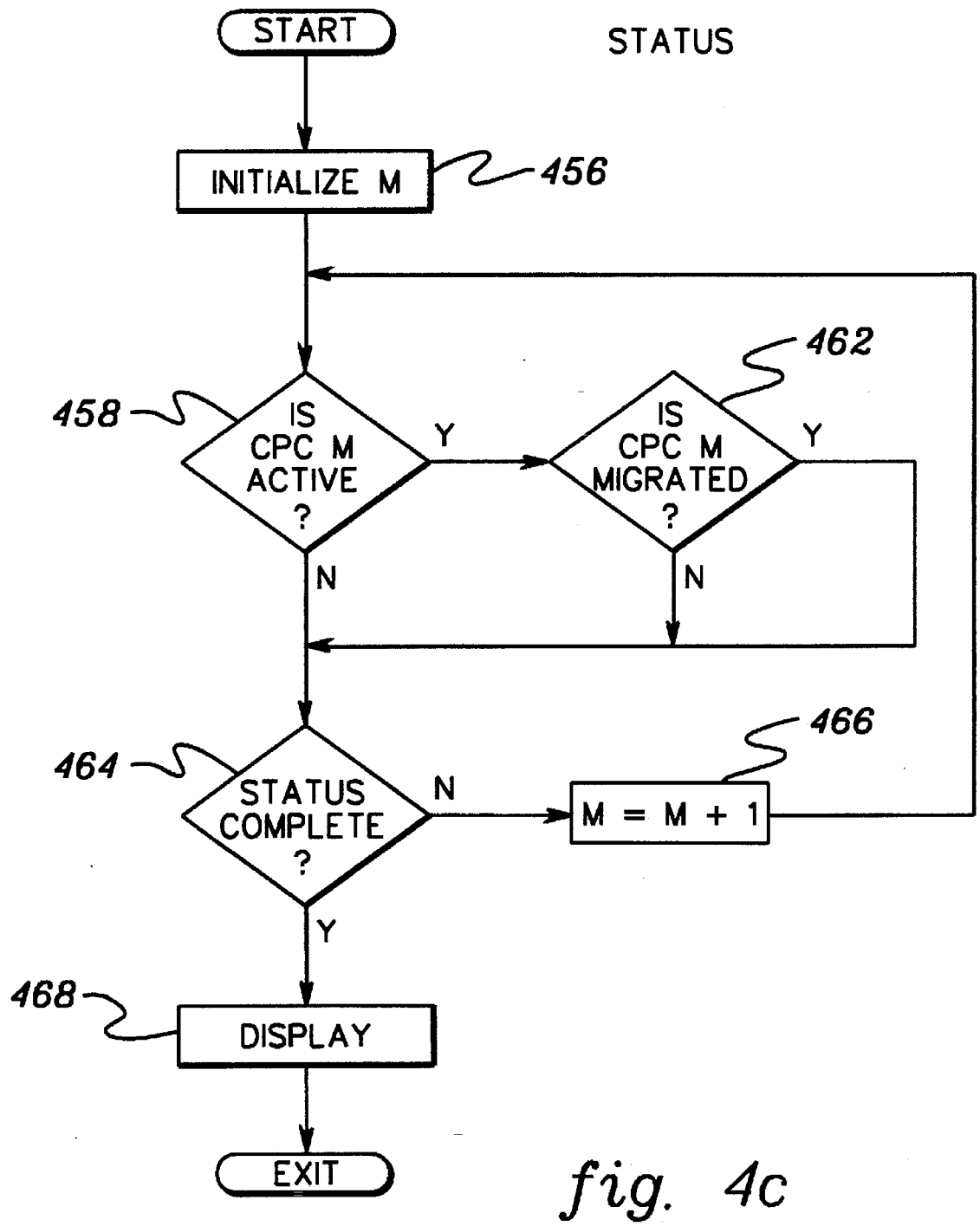
FIG. 4c depicts one example of the flow associated with inquiring of the status of the central processing complexes of the multiprocessing system of FIG. 1, in accordance with the principles of the present invention.

One embodiment of the logic associated with the converting driver is depicted in FIGS. 4–4c and described in detail below. Initially, the logic is described as it relates to issuing a change request by a central processing complex. In one particular embodiment, the change request is issued for a number of data records. Specifically, in one example, the change request is issued for data record 1 and one or more other data records (i.e., N data records). In this one example, the first data record is a serialization record which causes a lock to be held, thus allowing the central processing complex to access other data records. If the change request is a conversion request or a fall back request, the request is not satisfied until all the appropriate records are converted or fallen back. As described below, when all of the records have been appropriately changed, a flag in the serialization record (e.g., data record 1) indicates that the change is complete. This procedure is described in detail below.

Referring to FIG. 4, initially a change message is issued by one of the central processing units indicating that at least one data record is ready to be converted from the old format to a new format, that at least one data record is to fall back to the old format, or requesting status of the central processing complexes, STEP 402 "ISSUE CHANGE MESSAGE." When the issued request is a conversion request for data stored on the storage media, INQUIRY 404 "IS IT A REQUEST TO CONVERT?", then the logic depicted in FIG. 4a is invoked, STEP 406 "FIG. 4a."

Referring to FIG. 4a, in one particular example, format flag 202 of the serialization record (e.g., data record 1) is set to converting indicating that one or more data records stored on the storage media are going to be converted from the old format to a new format, STEP 408 "SET FLAG TO CONVERTING." Thereafter, data record 1 is written to the storage media in the new format, STEP 410 "WRITE RECORD TO STORAGE MEDIA."

Next, conversion begins for the rest of the data records to be converted. Initially, a variable N is initialized to the next record to be converted. In one example, N is set equal to 2, indicating that data record 2 is to be converted, STEP 412 "INITIALIZE N." Subsequently, record N is obtained from storage and stored within the internal shared memory of the requesting central processing complex, STEP 414 "GET RECORD N." Thereafter, record N is rearranged from the old format to the new format, in the manner described above, STEP 416 "CALL REARRANGER FOR RECORD N," and format flag 202 located within record N is set to converted, STEP 418 "SET FLAG IN RECORD N." After record N is converted, it is stored in the external storage media in its new format, STEP 420 "FILE RECORD N."

Next, a determination is made as to whether all of the appropriate records have been converted, INQUIRY 422 "COMPLETE?" In particular, a check is made as to whether N is equal to a high value, which indicates the highest record to be converted. If N is not equal to the high value, then in one example, N is incremented by one, STEP 424 "N=N+1" and the flow proceeds to STEP 414 "GET RECORD N" in order to repeat the process, as described above. However, if N equals the high value, then format flag 202 in record 1 is set to converted, indicating that all of the appropriate records have been converted to the new format, STEP 426 "SET FLAG TO CONVERTED IN RECORD 1."

The above flow logic is only one example. Other embodiments are also possible. For instance, it is possible to increment N by a number other than 1 or to specify in some other manner the records to be converted. Additionally, the technique of the present invention can be used to convert only one record, thereby not needing the logic associated with N records. Many other embodiments are also possible and are considered within the scope of the invention.

Returning to FIG. 4 and, in particular INQUIRY 404 "IS IT A REQUEST TO CONVERT?", if this is not a request to convert, then a further determination is made as to whether this is a request to fall back, INQUIRY 428, "IS IT A REQUEST TO FALL BACK?". That is, is the central processing complex requesting the data records to be unconverted. If this is a request to fall back, then the flow associated with FIG. 4b is invoked, STEP 430 "FIG. 4b."

Referring to FIG. 4b, initially, format flag 202 in data record 1 is set to falling back specifying that one or more of the data records will be converted from the new format back to the old format, in accordance with the principles of the present invention, STEP 432 "SET FLAG TO FALLING BACK." After setting the format flag, record 1 is written to the storage media in order to indicate that falling back is in progress, STEP 434 "WRITE RECORD 1 TO STORAGE MEDIA."

Next, the variable N is initialized to indicate the next data record to fall back to its previous format, STEP 436 "INITIALIZE N." After N is initialized, record N is obtained from the storage media, STEP 438 "GET RECORD N," and it is dearranged, STEP 440 "CALL DEARRANGER." Dearranging is accomplished in a similar manner to that described above for rearranging, except that the resulting format is the old format, instead of the new format. After data record N is reformatted to its old format, format flag 202 in record N is set to not converted, STEP 442 "SET FLAG TO NOT CONVERTED IN RECORD N," and record N is stored in the storage media in its old format, STEP 444 "FILE RECORD N."

Subsequent to completing processing of record N, a determination is made as to whether all of the records have been processed, INQUIRY 446 "COMPLETE?" If processing of all of the appropriate records has not been completed as determined by comparison of N with a high value of records, then N is incremented, STEP 448 "N=N+1," and processing continues with STEP 438 "GET RECORD N, " as described above However, if all of the records have been processed, then format flag 202 in data record 1 is set to not converted, STEP 450 "SET FLAG TO NOT CONVERTED IN RECORD 1," and data record 1 is written to the storage media in the old format.

As with the logic described with reference to FIG. 4a, the above flow logic is only one example. Again, it is possible to increment N in a different manner, to specify the records to be unconverted in a different way or to unconvert only one record. All of these embodiments, plus many more, are considered a part of the claimed invention.

Returning to FIG. 4 and, in particular, INQUIRY 428 "IS IT A REQUEST TO FALL BACK?", if this is not a request to fall back, then a further determination is made as to whether this is a request for status, INQUIRY 452 "IS IT A REQUEST FOR STATUS?" If this is not a request to convert, fall back or for status, then a error has been made, STEP 453 "ERROR." However, if this is a request for status, then the logic depicted in FIG. 4c is applicable, as described below, STEP 454 "FIG. 4c."

Referring to FIG. 4c, status is retrieved for each of the N central processing complexes. Thus, in one example, a variable M is initialized to 1 in order to obtain status of the first complex, STEP 456 "INITIALIZE M." In particular, a determination is made as to whether CPC M is active, INQUIRY 458 "IS CPC M ACTIVE?" Specifically, this is accomplished by performing a table look-up. If central processing complex M is active, then a further determination is made as to whether the central processing complex has been migrated to the new code, INQUIRY 462 "IS CPC M MIGRATED?" In one embodiment, this is determined by checking the migration bit for central processing complex M in record 1. If the bit is set, then the complex has been migrated. However, if the bit is not set, then the complex has not been migrated and the old data format is still being used by that complex. Thus, the data records cannot be converted, as of yet.

After the status for central processing complex 1 is determined, a decision is made as to whether status has been retrieved for all of the central processing complexes, INQUIRY 464 "STATUS COMPLETE?". That is, if M is less than N (the number of central processing complexes in the multiprocessing system), then M is incremented by 1, STEP 466 "M=M+1" and processing continues with INQUIRY 458 "IS CPC M ACTIVE?". However, when M is equal to N and the status has been retrieved for all of the complexes, the status is displayed, STEP 468 "DISPLAY."

The above-described procedure is only one example of the steps taken when a change request is issued by a central processing complex. In accordance with the principles of the present invention, the converting driver can also be invoked by a second central processing complex when it detects that the conversion or falling back of one or more data records has been interrupted. This scenario is described below.

If for example, a second central processing complex detects that a first central processing complex was in the process of converting data records from the old to new format, then the second central processing complex will complete the conversion for the first complex. In particular, the second complex will start with STEP 412 "INITIALIZE N" (FIG. 4a) and proceed, as described above. Similarly, if the second complex determines that the first complex was in the process of unconverting one or more data records and did not complete it for some reason, the second complex will take over by starting at STEP 436 "INITIALIZE N" (FIG. 4b) and continuing, as described above.

Described in detail above is one embodiment of a data conversion procedure that does not require the collapsing of the system in order to convert the shared data. In the embodiment described above, a serialization record is used. This is only one example. The inventive technique is equally applicable to those situations in which a serialization record is not used in that situation, there will be no controlling record to indicate when a group of records have been converted or fallen back. Instead, the format flag in each record will be checked to determine the status of that record.

The data conversion method and system of the present invention offers a number of advantages. First, shared data can be converted without bringing down the data processing system. Second, by enabling one processor at a time to use the new format, new programming code and new data formats can easily be tested before migrating the whole system. Third, if the data is converted and an error is found, measures are in place for backing out the changes without bringing down the system. Similarly, a processor that has received new code can back out to the old code without disrupting system availability. Fourth, two processors executing dissimilar code can share a single common data point where the data must be presented in different manners. The data is not replicated on the external storage media, thus there is no synchronization worries or dual maintenance of data records. Fifth, the data conversion is dynamic and transparent to the user. These and other advantages will be apparent to those skilled in the relevant art.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A data conversion method in a multiprocessing system comprising a first processor, a second processor, and an external storage media coupled to said first processor and said second processor, said external storage media comprising a datum having a first format, said datum sharable by said first processor and said second processor, said data conversion method comprising a method for converting said datum from said first format common to the first processor and the second processor to a new, second format common to the first processor and the second processor without bringing the multiprocessing system down, said method comprising:

retrieving by said first processor said datum from said external storage media in said first format and using said retrieved datum in the second format, wherein said datum in said first format is usable by said second processor;

retrieving by said second processor said datum from said external storage media in said first format and using said retrieved datum in said second format, wherein said datum is usable by said first processor and said second processor in said second format; and converting said datum on said external storage media from said first format to said second format after said datum is usable by said first processor and said second processor in said second format such that said datum in said second format is common to the first processor and the second processor, said converting allowing said first processor and said second processor to remain activated.

2. The data conversion method of claim 1, wherein said multiprocessing system comprises a first central processing complex and a second central processing complex, and wherein said retrieving by said first processor comprises retrieving by said first central processing complex comprising said first processor, and said retrieving by said second processor comprises retrieving by said second central processing complex comprising said second processor.

3. The data conversion method of claim 1, wherein said using comprises reformatting said datum from said first format to said second format.

4. The data conversion method of claim 3, further comprising:

unformatting said datum from said second format to said first format subsequent to using said datum; and storing said datum in said first format on said external storage media.

5. The data conversion method of claim 1, wherein said converting comprises:

writing said datum in said second format to said external storage media; and setting an indicator located within said datum to specify said datum has been converted.

6. The data conversion method of claim 5, further comprising modifying said datum on said external storage media from said second format to said first format, wherein said datum in said first format is usable by said first processor and said second processor.

7. The data conversion method of claim 6, wherein said modifying comprises:

retrieving said datum in said second format from said external storage media;

reformatting said datum to said first format when said datum is retrieved;

writing said datum in said first format to said external storage media; and setting an indicator located within said datum to specify said datum has been unconverted.

8. The data conversion method of claim 6, wherein said external storage media comprises a plurality of data records stored in said second format and wherein said modifying comprises:

(a) retrieving a first data record of said plurality of data records from said external storage media;

(b) setting an indicator located within said first data record to specify unconverting is beginning for said plurality of data records;

(c) reformatting said first data record to said first format when said first data record is retrieved;

(d) writing said first data record in said first format to said external storage media;

(e) retrieving a next data record of said plurality of data records;

(f) reformatting said next data record from said second format to said first format when said next data record is retrieved;

(g) setting a flag located within said next data record to indicate said next data record is not converted;

(h) writing said next data record in said first format to said external storage media;

(i) repeating steps (e)–(h) until a prespecified number of said plurality of data records are reformatted to said first format; and (j) setting said indicator to not converted when said prespecified number of said plurality of data records have been unconverted.

9. The data conversion method of claim 1, wherein said external storage media comprises a plurality of data records stored in said first format and said converting comprises:

(a) retrieving a first data record of said plurality of data records from said external storage media;

(b) setting an indicator located within said first data record to specify converting is beginning for said plurality of data records;

(c) reformatting said first data record to said second format when said first data record is retrieved;

(d) writing said first data record in said second format to said external storage media;

(e) retrieving a next data record of said plurality of data records;

(f) reformatting said next data record from said first format to said second format when said next data record is retrieved;

(g) setting a flag located within said next data record to indicate said next data record is converted;

(h) writing said next data record in said second format to said external storage media;

(i) repeating steps (e)–(h) until a prespecified number of said plurality of data records are converted; and (j) setting said indicator to converted when said prespecified number of said plurality of data records have been converted.

10. The data conversion method of claim 1, wherein prior to said using of said retrieved datum in the second format by said first processor, said method includes activating a new code at the first processor, said new code including translation code for converting the datum from the first format to the second format, and wherein prior to said using of said retrieved datum in the second format by said second processor, said method comprises activating the new code at the second processor, whereby activation of the new code within the multiprocessing system occurs in a stepwise manner.

11. A multiprocessing system comprising:

an external storage media comprising a datum having a first format common to a first processor and a second processor;

said first processor and said second processor being coupled to said external storage media, said first processor programmable to retrieve said datum from said external storage media in said first format and to use said datum in the second format when said datum is retrieved, wherein said datum in said first format is usable by said second processor;

said second processor programmable to retrieve said datum from said external storage media in said first format and to use said datum in said second format when said datum is retrieved, wherein said datum is usable by said first processor and said second processor in said second format; and means for converting said datum on said external storage media from said first format to said second format after said datum is usable by said first processor and said second processor in said second format such that said datum in said second format is common to the first processor and the second processor, said means for converting comprising means for allowing said first processor and said second processor to remain activate.

12. The multiprocessing system of claim 11, further comprising:

a first central processing complex comprising said first processor; and a second central processing complex comprising said second processor.

13. The multiprocessing system of claim 11, wherein said first processor and said second processor are further programmable to reformat said datum from said first format to said second format in order to use said datum in said second format.

14. The multiprocessing system of claim 13, further comprising means for unformatting said datum from said second format to said first format subsequent to using said datum in order to store said datum in said first format on said external storage media.

15. The multiprocessing system of claim 11, wherein said means for converting comprises:

means for writing said datum in said second format to said external storage media; and means for setting an indicator located within said datum to specify said datum has been converted.

16. The multiprocessing system of claim 15, further comprising means for modifying said datum on said external storage media from said second format to said first format, wherein said datum in said first format is usable by said first processor and said second processor.

17. The multiprocessing system of claim 16, wherein said means for modifying comprises:

means for retrieving said datum in said second format from said external storage media;

means for reformatting said datum to said first format when said datum is retrieved;

means for writing said datum in said first format to said external storage media; and means for setting an indicator located within said datum to specify said datum has been unconverted.

18. The multiprocessing system of claim 16, wherein said external storage media comprises a plurality of data records stored in said second format and wherein said means for modifying further comprises:

means for retrieving a first data record of said plurality of data records from said external storage media;

means for setting an indicator located within said first data record to specify unconverting is beginning for said plurality of data records;

means for reformatting said first data record to said first format when said first data record is retrieved;

means for writing said first data record in said first format to said external storage media;

means for retrieving a next data record of said plurality of data records;

means for reformatting said next data record from said second format to said first format when said next data record is retrieved;

means for setting a flag located within said next data record to indicate said next data record is not converted;

means for writing said next data record in said first format to said external storage media;

means for repeating said retrieving, said reformatting, said setting, and said writing until a prespecified number of said plurality of data records are reformatted to said first format; and means for setting said indicator to not converted when said prespecified number of said plurality of data records have been unconverted.

19. The multiprocessing system of claim 11, wherein said external storage media comprises a plurality of data records stored in said first format and said means for converting comprises:

means for retrieving a first data record of said plurality of data records from said external storage media;

means for setting an indicator located within said first data record to specify converting is beginning for said plurality of data records;

means for reformatting said first data record to said second format when said first data record is retrieved;

means for writing said first data record in said second format to said external storage media;

means for retrieving a next data record of said plurality of data records;

means for reformatting said next data record from said first format to said second format when said next data record is retrieved;

means for setting a flag located within said next data record to indicate said next data record is converted;

means for writing said next data record in said second format to said external storage media;

means for repeating said retrieving, said reformatting, said setting and said writing until a prespecified number of said plurality of data records are converted; and means for setting said indicator to converted when said prespecified number of said plurality of data records have been converted.

20. The multiprocessing system of claim 11, wherein said first processor is programmable with new code, including translation code for converting the datum from the first format to the second format, and wherein said second processor is also programmable with the new code, said translation code being employed to reformat said datum from said first format to said second format in order to use said datum in the second format.

* * * * *